US008911197B2

(12) United States Patent
Rossmann (10) Patent No.: US 8,911,197 B2
(45) Date of Patent: Dec. 16, 2014

(54) METHOD AND APPARATUS FOR THE RAPID TRANSPORT OF GLASS SHEETS (75) Inventor: Thomas Rossmann, Merlingen (DE)

(73) Assignee: Grenzebach Maschinenbau GmbH, Asbach-Baeumenhein (DE)

( * ) Notice: Subject to any disclaimer, the term of this patent is extended or adjusted under 35 U.S.C. 154(b) by 797 days.

(21) Appl. No.: 13/139,105

(22) PCT Filed: Nov. 26, 2009

(86) PCT No.: PCT/DE2009/001677
§ 371 (c)(1),
(2), (4) Date: Jun. 10, 2011

(87) PCT Pub. No.: WO2010/075830
PCT Pub. Date: Jul. 8, 2010

(65) Prior Publication Data
US 2011/0243691 A1  Oct. 6, 2011

(30) Foreign Application Priority Data
Dec. 17, 2008  (DE) .......................... 10 2008 062 153

(51) Int. Cl.
*B65G 49/06* (2006.01)
(52) U.S. Cl.
CPC ............ *B65G 49/067* (2013.01); *B65G 49/064* (2013.01); *B65G 49/061* (2013.01); *B65G 49/068* (2013.01); *B65G 2249/02* (2013.01)
USPC ................... 414/751.1; 414/225.01; 414/806
(58) Field of Classification Search
CPC .. B65G 49/061; B65G 49/064; B65G 49/067; B65G 49/068; B65G 2249/02; B21D 43/11
USPC ..................... 414/751.1, 222.01, 225.01, 806
See application file for complete search history.

(56) References Cited

U.S. PATENT DOCUMENTS

| 3,480,160 A | 11/1969 | Barradell-Smith et al. |
| 6,520,733 B1 | 2/2003 | Taniyama et al. |

(Continued)

FOREIGN PATENT DOCUMENTS

| DE | 1 292 581 | 4/1969 |
| DE | 1 556 146 | 2/1970 |

(Continued)

OTHER PUBLICATIONS

German Office Action, Dated Sep. 8, 2009.

(Continued)

*Primary Examiner* — Scott Lowe
(74) *Attorney, Agent, or Firm* — Brinks Gilson & Lione (57) ABSTRACT The invention relates to a method and to an apparatus for the rapid transport of glass sheets between different manufacturing stations in a spacious manufacturing plant for producing photovoltaic elements, wherein said manufacturing plant is subject to clean room conditions, comprising the following features: a) a freely movable mounting for conveying a lifting portal, b) at least one vertical lifting carriage for vertically transporting a glass sheet by means of a telescoping jack plate, wherein said plate can be extended in two opposite directions, has a local lowering and raising function and can transport a glass sheet continuously from one side of the vertical lifting carriage to the other side, c) for operation, the mechanically moved parts are encapsulated free of emissions in a clean room and made of abrasion-proof material, d) a cordless energy supply unit for operating the mounting.

17 Claims, 6 Drawing Sheets

(56) References Cited

U.S. PATENT DOCUMENTS

| | | | |
|---|---|---|---|
| 7,373,625 | B2 | 5/2008 | Stine et al. |
| 2006/0060446 | A1 | 3/2006 | Springmann |
| 2006/0216137 | A1 | 9/2006 | Sakata et al. |
| 2008/0050210 | A1* | 2/2008 | Katsuyama ............... 414/225.01 |

FOREIGN PATENT DOCUMENTS

| | | |
|---|---|---|
| DE | 2 154 709 | 5/1973 |
| DE | 26 02 622 | 7/1977 |
| DE | 84 29 202.4 | 1/1985 |
| DE | 40 00 081 A1 | 7/1991 |
| DE | 199 10 478 A1 | 12/1999 |
| DE | 101 42 395 A1 | 11/2002 |
| DE | 101 38 619 A1 | 3/2003 |
| DE | 20 2005 013 680 U1 | 12/2005 |
| DE | 10 2004 045 517 A1 | 4/2006 |
| EP | 0436137 A2 | 7/1991 |
| EP | 1 254 852 A1 | 4/2002 |
| FR | 2158399 | 6/1973 |
| JP | 07010267 A | 6/1993 |
| JP | 11-238775 | 8/1999 |
| JP | 2001253536 A | 3/2000 |
| JP | 2004-281821 | 10/2004 |
| JP | 2007-54939 | 3/2007 |
| JP | 2007-095740 A * 12/2007 ............ H01L 21/677 |
| WO | WO 2005/002804 A1 | 12/2003 |
| WO | WO 2007/091503 A1 | 8/2007 |

OTHER PUBLICATIONS

International Search Report for International Application No. PCT/DE2009/001677, Dated Apr. 29, 2010.

English Translation of the Notification of First Office Action for Chinese Application No. 200980148836.3, Dated Feb. 4, 2013.

Japanese Office Action dated Dec. 4, 2012 and English Translation.

* cited by examiner

METHOD AND APPARATUS FOR THE RAPID TRANSPORT OF GLASS SHEETS

CROSS REFERENCE TO RELATED APPLICATIONS

This application is a national stage application under 35 U.S.C. 371 of international application number PCT/DE2009/001677 filed Nov. 26, 2009 (WO 2010/075830 A1) and also claims priority to German application number 10 2008 062 153.6 filed Dec. 17, 2008, all of which are hereby incorporated by reference in their entirety.

SUMMARY

The invention relates to a method and an apparatus for the rapid transport of glass sheets between different production stations in a large-scale production plant. The production of photovoltaic elements is conceivable in this context, for example.

In relation to the prior art, DE 84 29 202 U1 discloses a stackable storage and transport frame for U-shaped glass webs. This is based on the object of providing a transport system for storing, loading and transporting U-shaped glass webs, consisting of two u-shaped metal frames into which the U-shaped glass webs are inserted in an upright manner with the interposition of intermediate elastic layers, which exerts no damaging compressive forces on the glass webs.

In order to achieve this object, it is proposed in said document that an angle profile which forms a bearing surface for the U-shaped glass frames and a slip-in pocket for a fork of a fork lift truck is arranged on the base part of each u-shaped metal frame parallel to the horizontal metal profile. In addition, tubular sleeves interacting in the upper region with a spacer bracket are arranged on the vertical angle profiles which form the side parts of the u-shaped metal frames.

No suggestions of the rapid transport of glass sheets in a large-scale production plant can be gathered from said document.

DE 15 56 146 A1 discloses a method for transporting a tabular item from a first position to a second position. This method is characterized in that, in the first position, a considerable negative pressure is exerted on the top surface of the tabular item, in order to hold the latter on a movable suction member by adhesive action. Furthermore, this document claims that, during the movement of the item into the second position, a relatively low negative pressure is maintained on the top surface, and then the item is mechanically separated from the movable suction member in order to conduct ambient air onto the top surface thereof, so that the item drops into the desired second position.

No suggestions of the rapid transport of glass sheets in a large-scale production plant can be gathered from this document either.

DE 12 92 581 A discloses a stack lifting unit in the form of a shelf stacking unit supported via rollers against rails on the shelf. This unit has a lifting carriage, which can be operated by means of lifting chains, and a short-lift apparatus which can be activated by means of a pressure-medium press. All apparatuses are operated manually here. In addition, this stack lifting unit is supported on the associated shelf and is therefore not freely movable. Apart from known operating principles of lifting technology, this document does not provide any suggestion of application in a modern production plant for producing photovoltaic elements in clean room conditions.

DE 101 38 619 A1 describes an apparatus for transporting, removing and positioning workpiece carriers. In the case of this apparatus, it is of major importance according to the information provided in the description that an extraction apparatus can be retracted with independent driving, irrespective of a lifting device, preferably between C profiles of storage systems, in which case the lifting device is vacated completely.

Apart from obvious advantages, no applicable teaching can be gathered from this document with its claims formulated around the object.

DE 20 2005 013 680 U1 discloses a shelf vehicle for a container store for moving the shelf vehicle along a shelf front, with load-bearing means which can be moved vertically and can be moved in the direction of the shelf depth between a central transport position and an extended transfer position. In order to reduce the running times required for the storage and retrieval of containers, this document substantially teaches the provision of a control device which controls the processes required.

No suggestion of the solution to the problem addressed by the invention can be found in said document.

DE 10 2004 045 517 A1 describes a system based on the object of reducing the outlay required for supplying power in this system, which consists of at least one movable functional device and a plurality of stationary functional devices each with an electric consumer, which can be fed via a power supply unit. This document suggests the known measure of providing an inductive power supply. A suggestion to carry out this measure in the apparatus according to the invention cannot be gathered from DE 10 2004 045 517 A1.

DE 21 54 709 A1 discloses a storage and retrieval vehicle for servicing high shelves, in each of the aisles of which a lifting mast equipped with lifting means is provided so as to be horizontally movable. In order to reduce losses of space, this document claims that at least two vertically movable lifting carriages are provided on a lifting mast. A significant enrichment of the prior art in terms of the apparatus according to the invention cannot be identified in said document.

EP 1 254 852 A1 describes a storage and transport system comprising one or more rows of shelves in a plurality of shelf planes for holding stored goods, a multiplicity of rail lines and a plurality of railbound vehicles, in which the intention is to increase the degree to which the volume is utilized and to make simple and cost-effective expansion possible for increasing the capacity. In order to achieve this object, said document substantially claims that means are provided for the supply of external power without cables to the vehicles during their operation, means for holding and delivering the stored goods for the individual vehicles are formed via a radio connection and the vehicles are equipped with a reception system for receiving and for converting the control signals transmitted by a control computer. A suggestion to carry out this measure in the apparatus according to the invention cannot be gathered from EP 1 254 852 A1.

DE 40 00 081 A1 discloses a switch control unit for a self-propelling floor conveyor vehicle. The features present in this document only marginally concern the apparatus according to the invention and provide no indication of the solution to the problem addressed by the invention.

DE 199 10 478 C2 relates to a method for transporting a substrate using a substrate transport apparatus. This involves the transport of relatively small wafers, whereas the invention involves the rapid transport of relatively large glass sheets. The sliding covers disclosed therein considerably reduce the emission of particles and are required therein.

A suggestion to carry out a comparable measure in the apparatus according to the invention cannot be gathered from DE 199 10 478 C2.

The apparatus and the method provide a transport apparatus for the transport of glass sheets, which can reliably receive glass sheets in stacks on both sides of the transport path thereof, can transport said sheets rapidly and over great distances and can set down said sheets reliably on both sides of the transport path, where the power is supplied without cables and clean room conditions have to be observed.

Further objects, features and advantages of this invention will become readily apparent to persons skilled in the art after a review of the following description, with reference to the drawings and claims that are appended to and form a part of this specification.

The apparatus according to the invention is described in more detail below.

DETAILED DESCRIPTION

Figure 1:
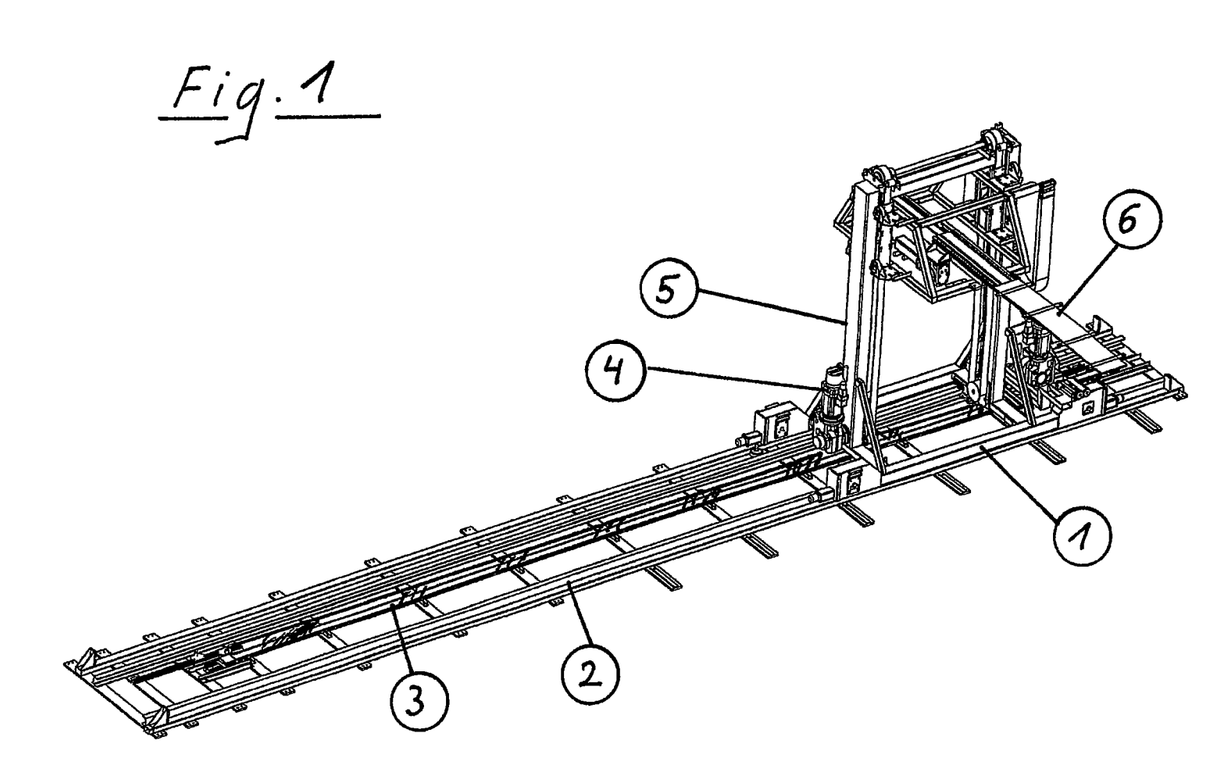
FIG. 1: is a perspective illustration of a transport apparatus.

FIG. 1 is a perspective illustration of a transport apparatus without a loading station or unloading station.

The mount 1 of the vertically oriented lifting gantry 5, which can move on the rails 2, is shown in the right-hand area on the two rails 2 running in the longitudinal direction. On the left-hand side of the lifting gantry 5, FIG. 1 shows the lifting drive 4 for the vertical upward movement and downward movement of a telescopic lifting carriage 11 and a telescopic jack plate 6 installed thereon. The telescopic jack plate 6 can be retracted and extended in a defined range on both sides of the displacement path of the mount 1, as determined by the rails 2. Here, the working height can be set in each case by means of the lifting drive 4 and the vertical lifting carriage 11. In the illustration shown, the telescopic jack plate 6 is extended to the right-hand side of the right-hand rail 2. This means that, compared to the situation shown in FIG. 3, the telescopic jack plate 6 is in a position in which it could set down a received glass sheet 12 in storage or a corresponding store.

Figure 2:
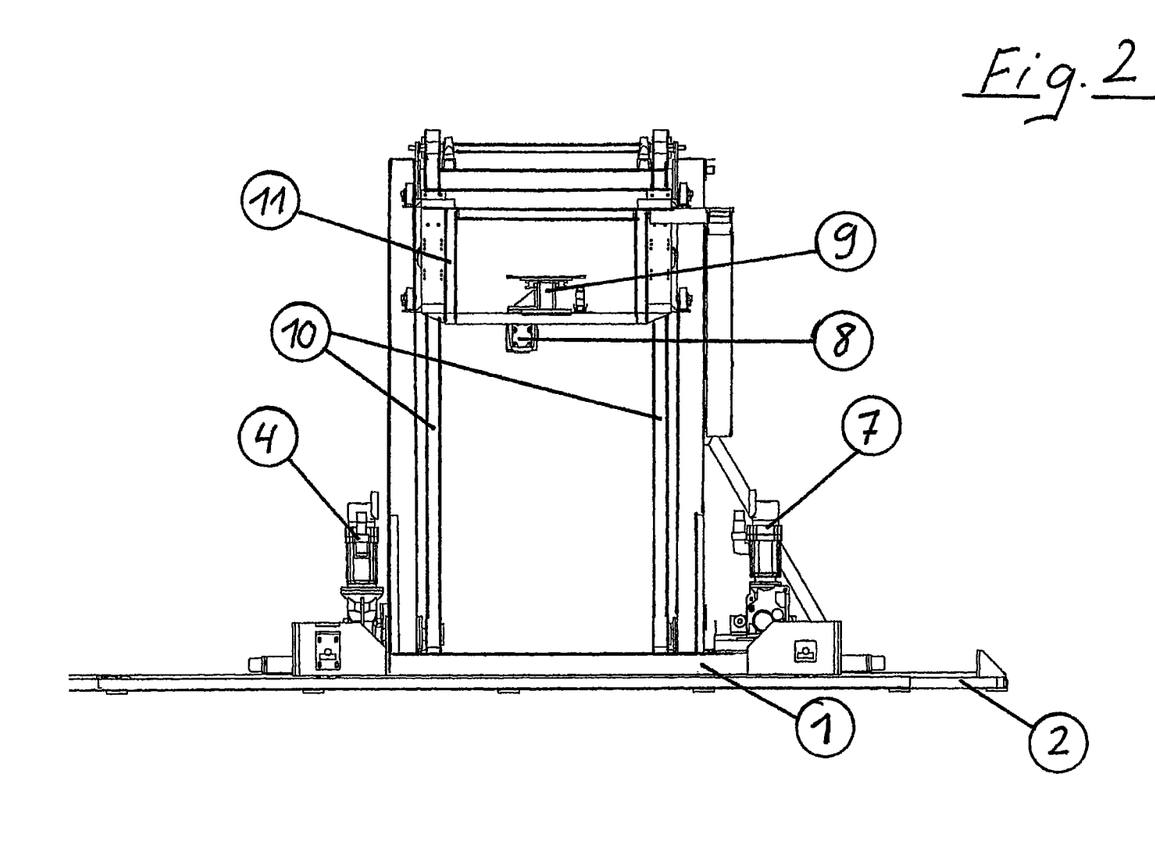
FIG. 2: shows a first cross section through the lifting gantry.

FIG. 2 shows a first cross section through the lifting gantry 5. This view is from the same side as FIG. 1. The two vertical supports, which form the lifting gantry 5 and between which the vertical lifting carriage 11 can move, are shown on the basis of the mount 1, which moves on the rails 2. For this purpose, a respective toothed belt 10 extends parallel to the left and right of the two longitudinal sides of the vertical lifting carriage 11 on the inner sides of the vertical supports of the lifting gantry 5. These two toothed belts 10 are driven by means of the lifting drive 4 shown on the left-hand side of the left-hand vertical support. A telescopic arm 9 is shown in cross section in the middle of the vertical lifting carriage 11. In conjunction with the telescopic jack plate 6, the telescopic arm 9 acts as a translator for the glass sheets lying on it. In FIG. 2, the drive 8 for this telescopic translator is installed underneath the telescopic arm 9 on the vertical lifting carriage 11. In FIG. 2, the drive 7 for the mount 1 is shown on the right-hand side of the right-hand vertical support.

Figure 3:
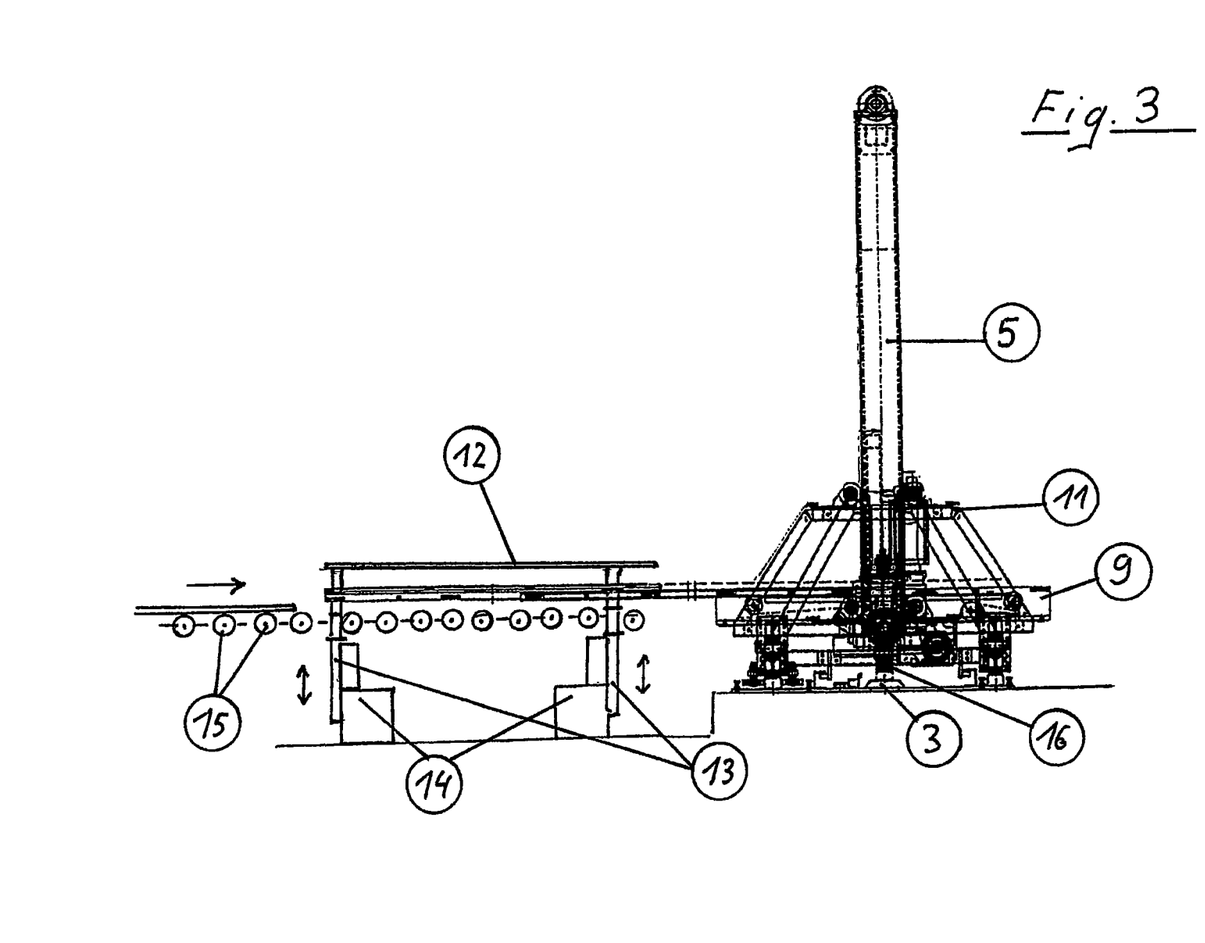
FIG. 3: shows a second cross section through the lifting gantry.

FIG. 3 shows a second cross section through the lifting gantry 5, which provides an illustration rotated through 90° compared to that shown in FIG. 2. Here, the vertical lifting carriage 11 is located in a lower position and is supplied with glass sheets 12 from the production line via the transport rollers 15. For this purpose, the glass sheets 12 in question are conveyed onto the transfer apparatus shown by the transport rollers 15. The adjustable vertical supports 14 of a lifting device can be used to raise and/or lower the respective glass sheet 12, guided on the vertical supports 13 of the transfer apparatus.

The transfer apparatus thereby serves as an intermediate store for the glass sheets 12 arriving on a production line. Since a plurality of glass sheets 12 can be simultaneously transported away by the apparatus according to the invention (cf. FIG. 5), in the time over which this intermediate store is loaded the mount 1 can simultaneously move a plurality of glass sheets 12 to a specific destination, unload them and then move back and pick up a new load.

In order to acquire a respective glass sheet 12 from the transfer apparatus, the telescopic jack plate 6 can be lowered in each case by a small amount by means of the vertical lifting carriage 11, and then, after the telescopic jack plate 6 has been moved down, can be raised again. This process is effected independently of the respective normal position of the telescopic jack plate 6, before the latter receives a glass sheet 12. For deposition in a specific store, this process takes place conversely. In FIG. 3, an induction loop 3 is shown as a transmitter in the region of the rails 2, and the associated receiver 16 for the power intake above in the region of the mount 1 corresponds thereto. In order to overcome relatively large distances, this cable-free power transmission has the advantage that appropriate induction coils with the appropriate cables for supplying power can easily be installed in the floor of relatively large industrial plants. The cables normally used for the supply of electrical power, which have to be wound or unwound by a separate apparatus in accordance with the distance traveled by a mount 1, are not only too cumbersome for overcoming relatively large distances, but are also prone to interference. Therefore, the transmission according to the invention of electrical power affords considerable advantages for this specific intended use.

Figure 4:
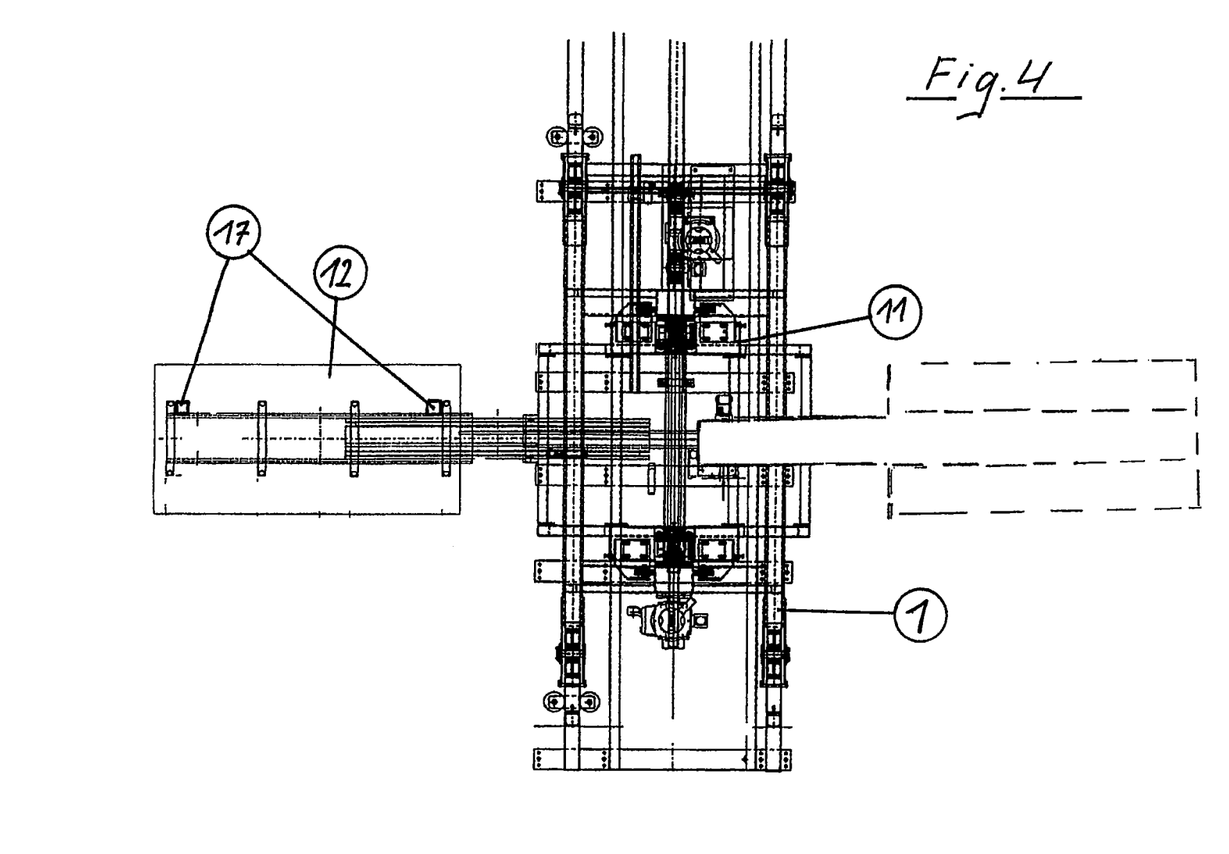
FIG. 4: is a plan view of the lifting gantry.

FIG. 4 shows a plan view of the lifting gantry 5 and the positional conditions during the transport of glass sheets 12 in cross section. In accordance with the illustration in FIG. 3, the left-hand side of FIG. 4 shows a glass sheet 12, which has been delivered by a production line, on an extended telescopic jack plate 6. In this case, the position sensors 17 shown here can be used to control the extension of a telescopic jack plate 6 and the travel thereof to the other side of a vertical lifting carriage 11. The vertical lifting carriage 11 is shown together with its units in the center of the lifting gantry 5. A mount 1 is shown for orientation. The right-hand side of FIG. 4 shows a telescopic jack plate 6 in the extended state with a glass sheet 12 (shown in dashed lines) for loading or unloading a target station. It can be seen clearly here that the telescopic jack plate 6 shown can convey a glass sheet 12 from one side of a vertical lifting carriage 11 through to the other side in order to fulfill its task.

Figure 5:
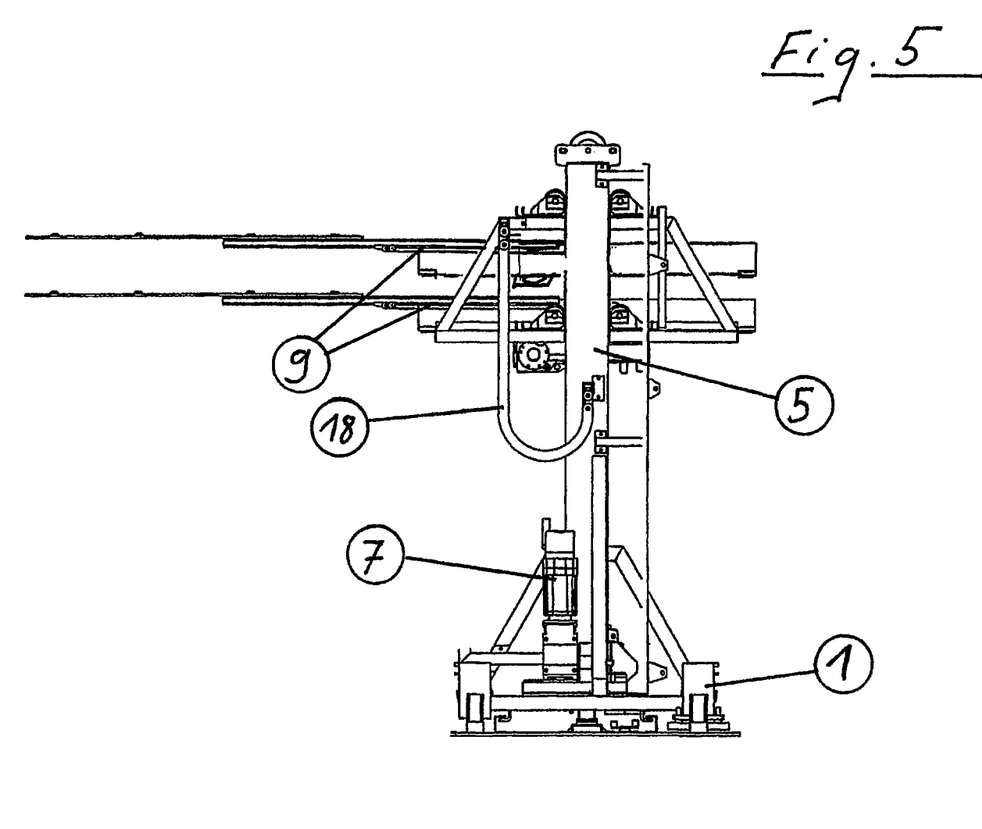
FIG. 5: shows a detailed cross section through the lifting gantry.

FIG. 5 shows a detailed cross section through the lifting gantry 5, with a vertical lifting carriage 11 in the topmost position. In addition to a rail 1 and the drive 7 for the mount 1, it can primarily be seen in FIG. 5 that two telescopic arms 9 each with a telescopic jack plate 6 resting thereon are installed one above the other in a vertical lifting carriage 11. Since, to date, in each case only one telescopic jack plate 6 or one telescopic arm 9 has been shown for reasons of overview, this figure clarifies that a plurality of telescopic jack plates 6 can be arranged one above another for the rapid transport of a plurality of glass sheets 12.

The line 18 comes from the induction receiver 16 and serves for supplying power and for controlling the telescopic apparatus. Here, the control signals can likewise be transmitted by means of induction and/or via radio.

Figure 6:
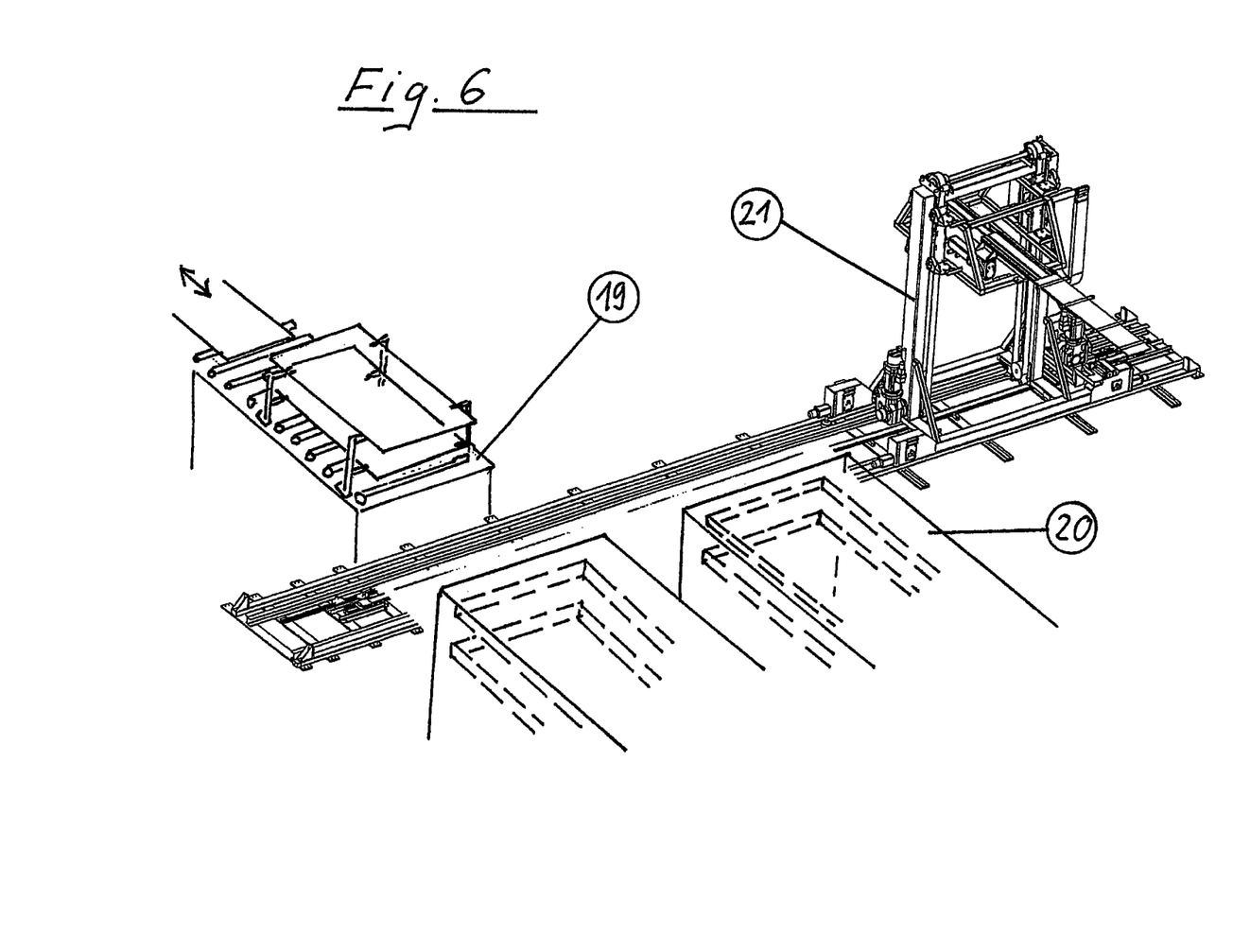
FIG. 6: is a perspective overview illustration of the functional region of a transport apparatus.

FIG. 6 is a perspective overview illustration of the functional region of a transport apparatus according to the invention. Here, the basic structure of the apparatus shown in FIG. 1 is shown in a factory using the example with a transfer apparatus 19 as supply station and/or removal station and further supply stations and/or removal stations as a sputtering and coating device 20. Purely by way of example, the telescopic moving and lifting device 21 shown here is equipped with merely one telescopic jack plate 6. Merely two stack planes are shown by way of example in the transfer apparatus 19 and the device 20. It can readily be seen here that a telescopic jack plate 6 can transport a glass sheet 12 continuously from one side of a vertical lifting carriage 11 to the other side. This is because it is otherwise not possible to convey a glass sheet 12 from the transfer apparatus 19 to the device 20, and vice versa. For the rapid transport of corresponding glass sheets 12, it is of course possible to install numerous telescopic jack plates 6 with the respective additional units in the vertical lifting carriage 11 used in each case, until the overall height of a lifting gantry 5 is reached.

For the logistics of extensive factories, it is also possible to upgrade an apparatus according to the invention with switches, since an inductive power supply can easily be upgraded. In addition, it is therefore also possible to simultaneously operate a plurality of apparatuses according to the invention within a logistic network. In the case of a conventional plant where power is supplied by means of cables, operation by way of switch positions would not be possible.

The complex control of the movement profiles described requires a special control program.

As a person skilled in the art will readily appreciate, the above description is meant as an illustration of implementation of the principles this application. This description is not intended to limit the scope or application of this invention in that the invention is susceptible to modification, variation and change, without departing from the spirit of this application, as defined in the following claims.

LIST OF REFERENCE NUMERALS (1) Mount of the lifting gantry 5
(2) Rail
(3) Induction loop
(4) Lifting drive
(5) Vertical lifting gantry
(6) Telescopic jack plate
(7) Drive of the mount 1
(8) Drive of the telescopic translator 6, 9
(9) Telescopic arm
(10) Toothed belts of the drive of the vertical lifting carriage
(11) Vertical lifting carriage
(12) Glass sheet
(13) Vertical supports of the transfer apparatus
(14) Vertical supports of the lifting device of the transfer apparatus
(15) Transport rollers of a production line
(16) Induction receiver
(17) Position sensors
(18) Power supply unit and control line of the telescopic apparatus
(19) Transfer apparatus
(20) Sputtering and coating device
(21) Telescopic moving and lifting device

The invention claimed is:

1. An apparatus for rapid transport of glass sheets between different production stations in a large-scale production plant for producing photovoltaic elements, wherein said production plant is subject to clean room conditions, the apparatus comprising:
    a freely movable mount for conveying a lifting gantry in a first horizontal direction;
    at least one vertical lifting carriage configured to transport a glass sheet utilizing a telescopic jack plate, wherein said plate is configured to:
        receive the glass sheet by linear extension in a second horizontal direction,
        lower and raise the glass sheet vertically, and
        transport the glass sheet across the vertical lifting carriage by linear extension in a third horizontal direction; and
    a cable-free power supply unit for operating the mount.

2. The apparatus as claimed in claim 1, wherein a respective vertical lifting carriage is configured for receiving a plurality of telescopic jack plates.

3. The apparatus of claim 2, wherein each one of the telescopic jack plates is configured to transport a respective glass sheet.

4. The apparatus of claim 3, wherein the plurality of telescopic jack plates transport a plurality of glass sheets substantially simultaneously.

5. The apparatus as claimed in claim 1, wherein a plurality of mounts each with a plurality of vertical lifting carriages and a plurality of telescopic jack plates are used to supply a plurality of production lines or a plurality of production stations.

6. The apparatus as claimed in claim 1, wherein positioning of the glass sheets is monitored using sensors.

7. The apparatus of claim 1, wherein, mechanically moving parts of the apparatus are encapsulated free from emissions and are produced from abrasion-resistant material for operation in a clean room.

8. A method for rapid transport of glass sheets between different production stations in a large-scale production plant for producing photovoltaic elements, wherein said production plant is subject to clean room conditions, the method comprising:
    transporting a glass sheet to be conveyed from a first production station to a second production station by using a telescopic jack plate, wherein transporting the glass sheet comprises:
        receiving the glass sheet from the first production station by raising the telescopic lack plate,
        delivering the glass sheet to the second production station by lowering the telescopic lack plate,
        moving, as a constituent part of a lifting gantry, the telescopic jack plate between the first and second production stations via a mount on rails, wherein the telescopic jack plate is a constituent part of a vertical lifting carriage within the lifting gantry, and
        linearly extending the telescopic jack plate via a telescopic arm in two opposite directions transverse to the direction of the rails by a drive on the vertical lifting carriage, in response to the first and second production stations being on opposite sides of the rails; and operating the lifting gantry using wireless power supplied in the region of the rails via induction loops laid in the ground and an induction receiver fitted in the mount.

9. The method as claimed in claim 8, wherein the vertical lifting carriage is configured for receiving a plurality of telescopic jack plates.

10. The method as claimed in claim 8, wherein positioning of the glass sheets is monitored using at least one sensor.

11. The method of claim 8, wherein transporting the glass sheet comprises:
 linearly extending the telescopic jack plate in a single direction transverse to the direction of the rails, in response to the first and second production stations being on the same side of the rails.

12. The method of claim 11, wherein the telescopic jack plate is a first telescopic jack plate, the glass sheet is a first glass sheet, and the method further comprises:
 moving the first telescopic jack plate vertically up, after receiving the first glass sheet;
 linearly extending a second telescopic jack plate towards the first production station;
 receiving a second glass sheet from the first production station by raising the second telescopic jack plate;
 linearly extending the second telescopic jack plate towards the second production station; and
 delivering the second glass sheet to the second production station by lowering the second telescopic jack plate.

13. The method of claim 12, further comprising:
 moving the first telescopic jack plate vertically down, after delivering the second glass sheet.

14. A machine-readable storage medium with program code executable by a computer to transport a glass sheet from a first station to a second station via a lifting carriage mounted on rails, the program code comprising:
 instructions to move the lifting carriage in a horizontal direction along the rails and between the first station and the second station;
 instructions to extend a telescopic plate of the lifting carriage towards the first station to receive the glass sheet from the first station, the telescopic plate extended in a first horizontal direction away from the lifting carriage and at an angle to the rails;
 instructions retract the telescopic plate with the glass sheet, horizontally, back towards the lifting carriage; and
 instructions to extend the telescopic plate towards the second station to place the glass sheet at the second station, the telescopic plate linearly translated in a direction opposite to the first horizontal direction away from the lifting carriage.

15. The machine-readable storage medium of claim 14, the program code further comprising:
 instructions to raise the telescopic plate locally to lift the glass sheet disposed at the first station; and
 instructions to lower the telescopic plate locally to place the glass sheet at the second station.

16. The machine-readable storage medium of claim 14, the program code further comprising:
 instructions to transport a plurality of glass sheets from the first station to the second station using a plurality of telescopic plates of the lifting carriage, wherein each one of the telescopic plates transports a respective one of the glass sheets.

17. The machine-readable storage medium of claim 16, the program code further comprising:
 instructions to move the plurality of telescopic plates vertically by the lifting carriage.

\* \* \* \* \*

UNITED STATES PATENT AND TRADEMARK OFFICE
CERTIFICATE OF CORRECTION

PATENT NO. : 8,911,197 B2
APPLICATION NO. : 13/139105
DATED : December 16, 2014
INVENTOR(S) : Thomas Rossmann It is certified that error appears in the above-identified patent and that said Letters Patent is hereby corrected as shown below:

In the Claims

Column 7, Claim 8, lines 55 and 57, "lack" should be --jack--.

Signed and Sealed this
Fourteenth Day of April, 2015

Michelle K. Lee
*Director of the United States Patent and Trademark Office*